United States Patent [19]
Chou

[11] Patent Number: 5,875,376
[45] Date of Patent: Feb. 23, 1999

[54] CARRIAGE POSITIONING STRUCTURE FOR A SCANNER

[75] Inventor: Jason Chou, Taipei, Taiwan

[73] Assignee: E-Lux Inc., Taipei Hsien, Taiwan

[21] Appl. No.: 114,266

[22] Filed: Jul. 13, 1998

[51] Int. Cl.[6] .......................... G03B 27/34; G03G 15/04; G03G 15/28; H04N 1/04
[52] U.S. Cl. ......................... 399/211; 355/57; 358/474; 399/206; 399/213
[58] Field of Search .................................. 379/206, 211, 379/213; 355/57, 67, 75; 358/296, 474, 493

[56] References Cited

U.S. PATENT DOCUMENTS 4,264,198  4/1981  Miyamoto .................................. 355/57

*Primary Examiner*—Arthur T. Grimley
*Assistant Examiner*—Hoang Ngo

*Attorney, Agent, or Firm*—Dougherty & Troxell

[57] ABSTRACT

A carriage positioning structure includes a carriage pivoted to a longitudinal guide rod and reciprocated along a longitudinal sliding rail inside a scanner between a bottom shell and a flat glass plate, an image pick-up mechanism carried on the carriage and moved with the carriage to pick up the image of an object placed on the flat glass plate, a bottom guide wheel mounted on the carriage at the bottom and supported on the longitudinal sliding rail to guide reciprocating movement of the carriage along the longitudinal sliding rail, and a top guide wheel mounted on the carriage at the top and spaced below the flat glass plate by a gap, the top guide wheel being forced into contact with the flat glass plate by the gravity weight of the carriage when the scanner is turned upside down, permitting the carriage to be reciprocated on the flat glass plate along the longitudinal guide rod so that the image pick-up mechanism can pick up the image of a 3-D document placed below the scanner.

3 Claims, 3 Drawing Sheets

CARRIAGE POSITIONING STRUCTURE FOR A SCANNER

BACKGROUND OF THE INVENTION

The present invention relates to scanners, and more specifically to a carriage positioning structure for a scanner which enables the scanner to pick up the image of an object placed thereon, or turned upside down to pick up the image of an object placed below it.

Regular scanners are commonly designed to pick up the image of flat sheets of document (2-dimensional scanning). If a sufficient depth of field is provided, a scanner can be used to pick up the image of a 3-D object. However, because regular scanners are commonly designed for 2-dimensional scanning, it is difficult to use a regular scanner to pick up the image of a 3-D object. When using a regular scanner to pick up the image of a 3-D object, the scanner may have to be turned upside down, however the image pick-up module (mechanism) cannot be stably reciprocated when the scanner is turned upside down.

SUMMARY OF THE INVENTION

The present invention has been accomplished under the circumstance in view. According to the preferred embodiment of the present invention, the carriage positioning structure comprises a longitudinal guide rod and a longitudinal sliding rail arranged in parallel inside a scanner between a bottom shell and a flat glass plate, a carriage holding an image pick-up mechanism and reciprocated along the longitudinal guide rod and the longitudinal sliding rail, the carriage having a transverse sleeve integral with a bottom side wall thereof and sleeved onto the longitudinal guide rod, a bottom guide wheel mounted on the bottom side wall and supported on the longitudinal sliding rail, and a top guide wheel at a top side thereof spaced from the flat glass plate by a gap. When the scanner is turned upside down to scan a 3-D object placed below it, the top guide wheel is forced into contact with the flat glass plate by the gravity weight of the carriage, permitting the carriage to be reciprocated on the flat glass plate along the longitudinal guide rod stably.

BRIEF DESCRIPTION OF THE DRAWINGS

The foregoing and other features and advantages of the present invention will be more clearly understood from the following detailed description and the accompanying drawings, in which.

FIG. 2A is an enlarged view of a part of FIG. 2.

DETAILED DESCRIPTION OF THE PREFERRED EMBODIMENT

Figure 1:
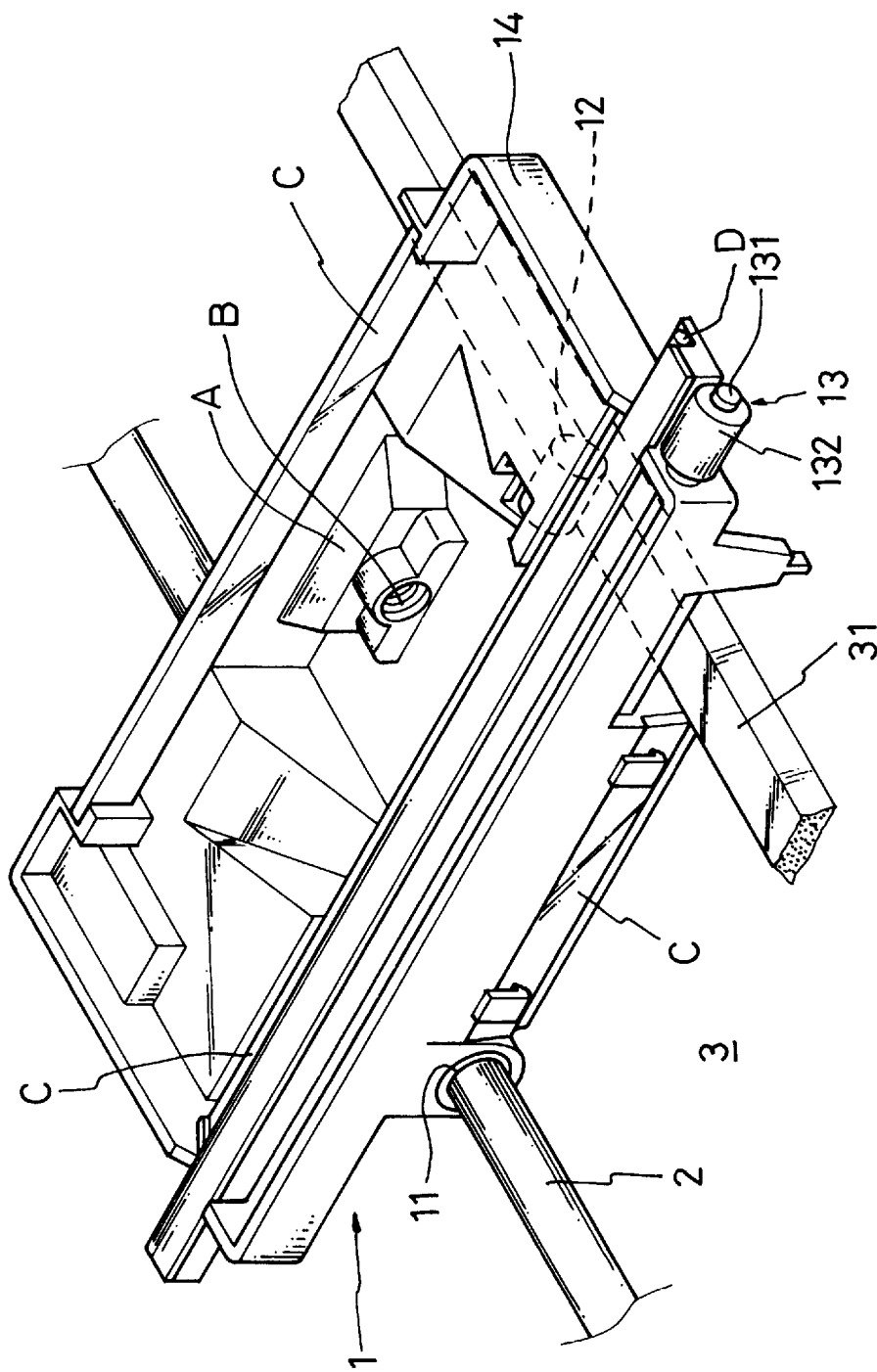
FIG. 1 is a perspective view of the preferred embodiment of the present invention.
Figure 2:
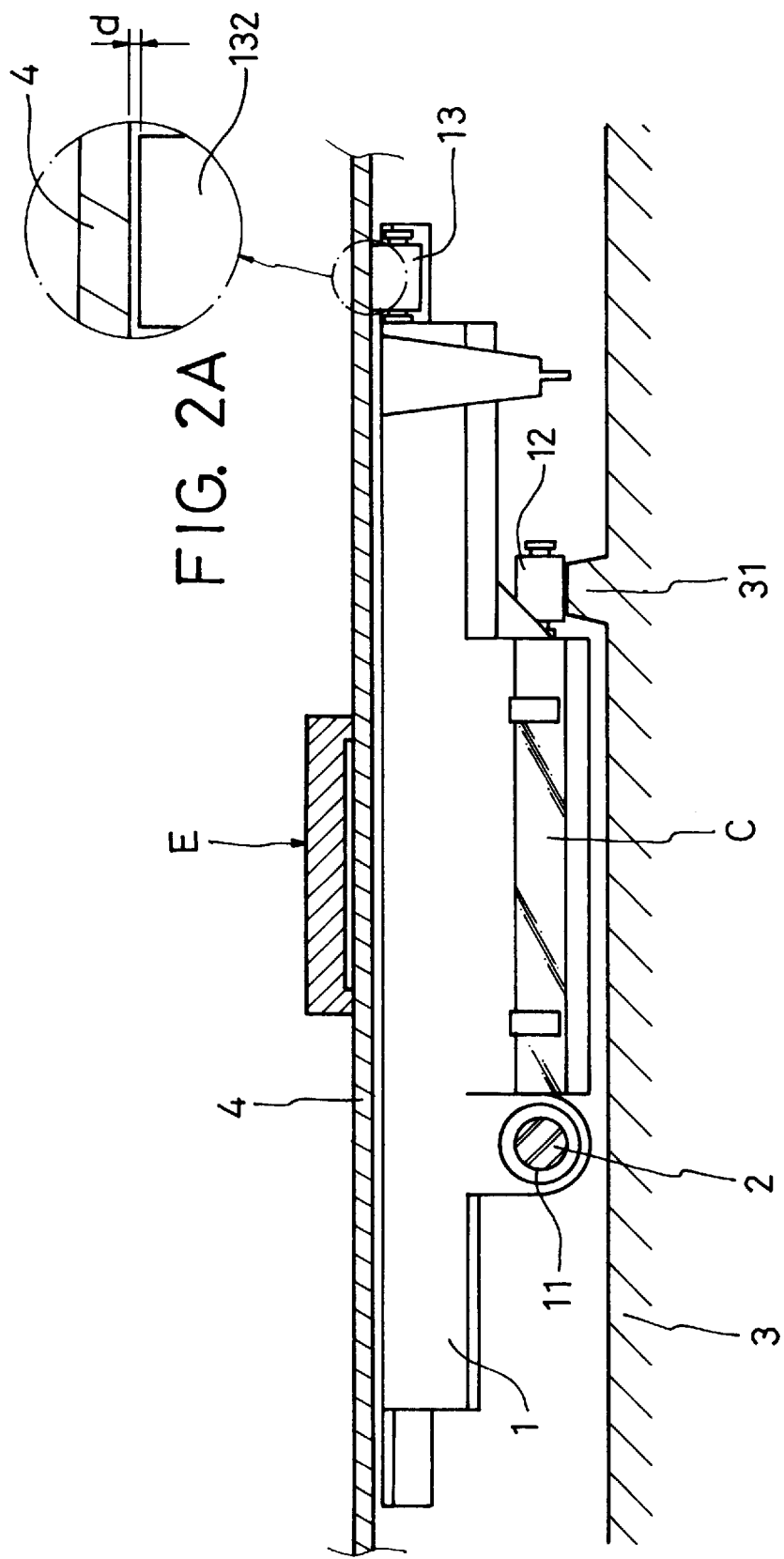
FIG. 2 is a sectional view showing an application example of the present invention.

Referring to FIGS. 1 and 2, a carriage 1 is moved along a longitudinal guide rod 2 and a longitudinal sliding rail 31 below a flat glass cover plate 4. The sliding rail 31 is integral with a bottom shell 3 of a scanner (not shown) at a top side, and arranged in parallel to the longitudinal guide rod 2. The carriage 1 holds an image pick-up mechanism on the inside, which is comprised of a CCD (charge-coupled device) A, a lens B in front of the CCD A, reflectors C, and a light source for example a lamp tube D. The carriage 1 comprises a transverse sleeve 11 integral with the bottom side wall thereof, which is sleeved onto the longitudinal guide rod 2, and a bottom guide wheel 12 mounted on the bottom side wall, which is supported on the longitudinal sliding rail 31. When the scanner is operated, the carriage 1 is reciprocated by a transmission mechanism (which can be a gear transmission mechanism, belt transmission mechanism, screw transmission mechanism, etc.) along the longitudinal guide rod 2 and the longitudinal sliding rail 31.

A top guide wheel 13 is provided at the top side of the carriage 1, and spaced from the flat glass cover plate 4 at a gap "d". The top guide wheel 13 is preferably mounted on the carriage 1 right above the bottom guide roller 12. The top guide wheel 13 comprises a horizontal wheel axle 131 extended from one vertical side wall 14 of the carriage 1, and a roller body 132 rotated on the horizontal wheel axle 131.

Referring to FIGS. 2 and 2A, when the scanner is operated to reciprocate the carriage 1 on the longitudinal guide rod 2 and the longitudinal sliding rail 31 below the flat glass plate 4, the roller body 132 of the top guide wheel 13 is maintained spaced below the flat glass plate 4, enabling the image pick-up mechanism to pick up the image of the 3-D object E placed on the flat glass plate 4.

Figure 3:
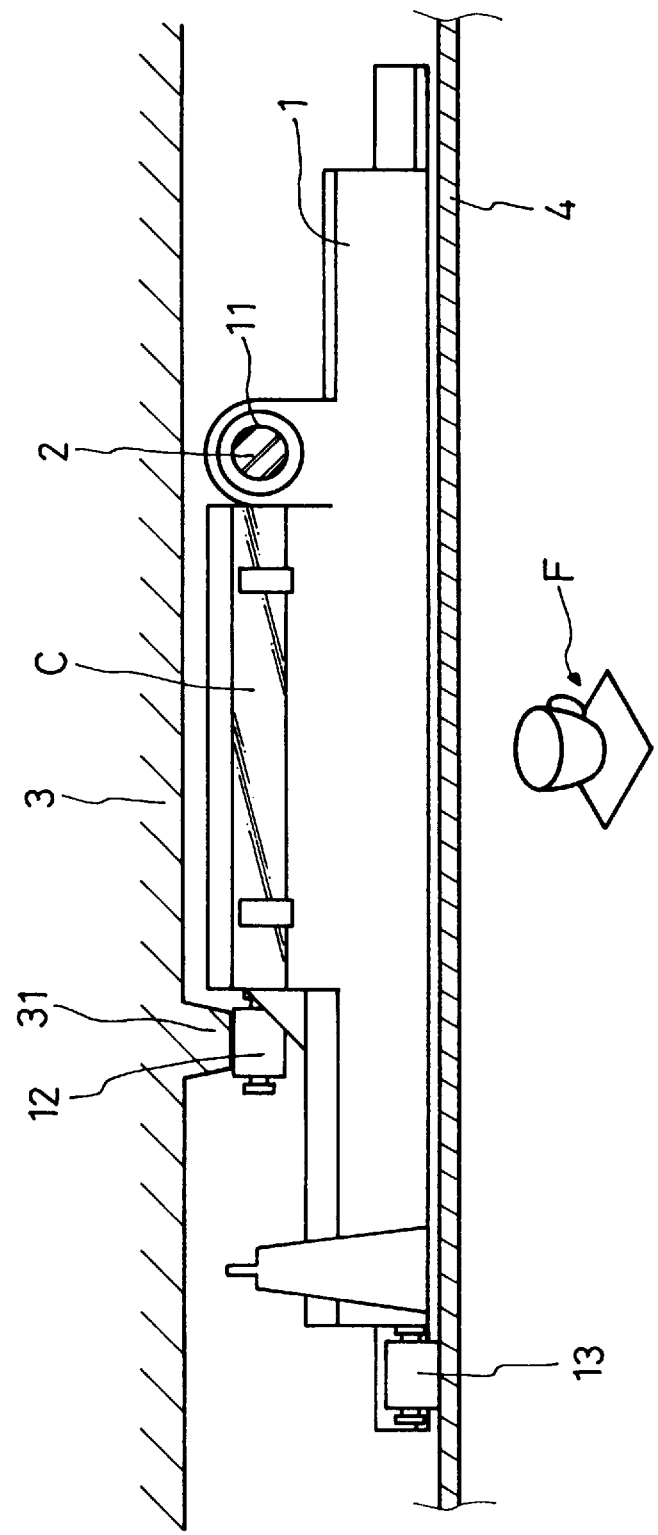
FIG. 3 is a sectional view showing another application example of the present invention.

Referring to FIG. 3, when the scanner is turned upside down to pick up the image of a 3-D object F placed below the scanner, the top guide wheel 13 is forced by the gravity weight of the carriage 1 into close contact with the flat glass plate 4, enabling the carriage 1 to be smoothly reciprocated along the longitudinal guide rod 2, so that the image pick-up mechanism can positively accurately pick up the image of the 3-D object F below. Because the top guide wheel 13 is rotated when the carriage 1 is moved along the longitudinal guide rod 2, reciprocating the carriage 1 does not cause much noise.

While only one embodiment of the present invention has been shown and described, it will be understood that various modifications and changes could be made thereunto without departing from the spirit and scope of the invention disclosed.

What the invention claimed is:

1. A carriage positioning structure comprising a longitudinal guide rod and a longitudinal sliding rail arranged in parallel inside a scanner between a bottom shell and a flat glass plate, a carriage holding an image pick-up mechanism and reciprocated along said longitudinal guide rod and said longitudinal sliding rail, said carriage having a transverse sleeve integral with a bottom side wall thereof and sleeved onto said longitudinal guide rod and at least one bottom guide wheel mounted on the bottom side wall and supported on said longitudinal sliding rail, wherein said carriage comprises at least one top guide wheel at a top side thereof spaced from said flat glass plate by a gap, said at least one top guide wheel being forced into contact with said flat glass plate by the gravity weight of said carriage when the scanner is turned upside down, permitting said carriage to be reciprocated on said flat glass plate along said longitudinal guide rod.

2. The carriage positioning structure of claim 1 wherein said at least one top guide wheel is respectively provided at one lateral side of said carriage remote from said transverse sleeve.

3. The carriage positioning structure of claim 1 wherein said at least one top guide wheel each comprises a horizontal wheel axle extended from one vertical side wall of said carriage and a wheel body rotated on said horizontal wheel axle.

* * * * *